United States Patent [19]
Nomura

[11] 4,085,624
[45] Apr. 25, 1978

[54] ELECTRICALLY DRIVEN ACTUATOR

[75] Inventor: Chifuru Nomura, Chino, Japan

[73] Assignee: Kitazawa Shoji Kabushiki Kaisha, Tokyo, Japan

[21] Appl. No.: 669,890

[22] Filed: Mar. 24, 1976

[51] Int. Cl.² .............................. F16H 27/02
[52] U.S. Cl. .................................... 74/89.15
[58] Field of Search ........................... 74/89.15

[56] References Cited

U.S. PATENT DOCUMENTS

| | | | |
|---|---|---|---|
| 3,572,140 | 3/1971 | Gulick | 74/89.15 |
| 3,640,140 | 2/1972 | Gulick | 74/89.15 |

*Primary Examiner*—Benjamin W. Wyche
*Assistant Examiner*—Wesley S. Ratliff, Jr.
*Attorney, Agent, or Firm*—McNenny, Pearne, Gordon, Gail, Dickinson & Schiller

[57] ABSTRACT

An electrically driven actuator having a rotary output shaft for actuating a valve apparatus is disclosed. An electric motor is employed to rotationally drive a pair of parallel threaded shafts symmetrically disposed with respect to the rotary shaft in a plane extending transversely to the plane of the axis of rotation of the rotary shaft. A transverse arm rotationally fixed to the rotary shaft slidably engages feed nuts carried by the threaded shafts for axial movement therealong upon shaft rotation, and the transverse arm is moved in a pivotal, swinging movement sweeping the axial paths of the feed nuts to provide rotation of the rotary output shaft. The provision of a pair of transverse arms extending from axially spaced positions along the rotary shaft on each side of the plane of the threaded shafts is also disclosed. In a modified actuator structure, the use of a worm wheel rotationally fixed to the rotary shaft and directly engaging the threaded shafts is shown. In addition, an adjustable drive gear operating between the electric motor and one of the threaded shafts enables the angular orientation of the one shaft to be independently adjusted in order to synchronize it with the other threaded shaft.

16 Claims, 8 Drawing Figures

ELECTRICALLY DRIVEN ACTUATOR

BACKGROUND OF THE INVENTION

The present invention relates to a driving device to rotate a valve stem included in valves such as a butterfly valve, a ball valve and a gate valve, and, more particularly, to a driving device having a novel mechanism suitable as an electrically driven actuator utilizing an electrical power source.

Valves adapted to control the supply of various fluids are employed in the chemical industry and other industries as important parts of various equipment. The manner of use of these valves has recently become automatic as a marked tendency to meet the automation of the equipment with which they are associated. The power source for the automatic control system in such equipment may be a pneumatic source, a hydraulic source or other source such as an electric power source, as the individual case demands.

The electrically driven actuator of the prior art using electric power as a drive source has been disadvantageous in that the equipment is generally bulky, of heavy weight, of high cost and of low efficiency. In such prior art electrically driven actuators, a decelerator comprising a worm gear mechanism has often been used and, accordingly, an electric motor has been coupled to a valve stem always at a constant reduction ratio. On the other hand, the output torque characteristic of the electric motor has largely depended upon the rotational velocity of the electric motor and a torque from r.p.m. of zero, i.e., a starting torque has had to be sufficiently large to start a driven apparatus. Accordingly, selection of the electric motor has been based not only on the rated torque thereof at the normal condition but also on the magnitude of the starting torque.

In view of the foregoing, the prior art mechanisms in which, as previously described, the electric motor is coupled to the valve stem at a constant reduction ratio without any consideration of the high torque required to start the rotation of the valve stem, have been ineffective to obtain a desired operation. In rotational operation of a valve, a slow velocity is desirable in opening or closing the valve so as to eliminate so-called surged pressure possibly generated within tubes having the valve connected thereto. During normal operation, however, fast velocity is desirable. So it is often necessary to provide the actuator with a velocity controller. However, prior art controllers have been generally complex in construction and difficult to operate. The various disadvantages previously pointed out have resulted from this deficiency.

Although it has already been proposed that a drive transmission to obtain a final rotary drive be achieved at two points symmetrical with respect to the rotary shaft so as to provide a mechanism of small size and light weight, no satisfactory result has been obtained heretofore in terms of a mass production mechanism. This is true since the effect of the prior art drive transmission has often been biased to any one of the two points due to the unevenness of working and assembling accuracies of the respective parts.

A principal object of the present invention is, therefore, to overcome the foregoing disadvantages by providing a novel device to open and close a valve stem and, more particularly, by providing a driving device which is suitable as an electrically driven actuator utilizing an electric motor as a drive source and operating at an angle of 90°.

Another object of the present invention is to provide an improved actuating mechanism comprising a new characteristic of rotational velocity in itself adapted for effective valve operation.

Another object of the present invention is to provide an electrically driven actuator of small size, low cost and light weight and thereby not only facilitate the incorporation of an electrically driven actuator into an automatic valve, but also simplify the design of various apparatuses of which the automation is desired and where it is also desired to use an electric power as a drive source in a control system of the apparatus. For example, the actuator of the present invention is especially advantageous in applications where there are a plurality of driven mechanisms spaced from each other and a pneumatic or hydraulic drive is not suitable or where a pneumatic or hydraulic drive source is not advailable or difficult to install.

A further object of the present invention is to permit such a mechanism to be employed to provide a drive transmission having a final rotary drive achieved at two points symmetrical with respect to a rotary shaft.

Further objects of the present invention will be apparent from reading the following description.

These objects are achieved, in accordance with the present invention, by the drive device to open and close the valve stem, which includes therein a mechanism as described below.

The mechanism is principally characterized by the provision of a threaded shaft arrangement which drives a transversely disposed rotary shaft adapted to be operatively connected to a valve apparatus to be actuated. The threaded shaft arrangement is itself adapted to be driven by an electric motor and apply a uniform rotational drive to the rotary shaft.

In one of the illustrated embodiments, the novel driving device to open and close the valve stem disclosed here according to the present invention is an electrically driven actuator comprising a housing including a rotary shaft adapted to connect the actuator to a valve apparatus. The rotary shaft extends transversely of an axis of the housing within the housing and has at least one end projecting outwardly from the housing so that the one end may be associated with a valve stem. Preferably, a pair of threaded shafts extend in parallel relationship with respect to each other within the housing in a plane transverse to the rotary shaft, and the threaded shafts are located symmetrically with respect to the rotary shaft. Movable bodies including projecting shafts are mounted on the respective threaded shafts so that these movable bodies may move along their respective theaded shaft as the threaded shafts rotate. Operating arms which are shaped symmetrically with respect to the rotary shaft are fixed thereto within the movement ranges of the projecting shafts so that the operating arms may swing integrally with the rotary shaft. Longitudinal slots or slits are formed in the operating arms for slidably receiving the respective projecting shafts of the movable bodies. The directions in which the threads of the respective threaded shafts are wound and the mechanism by which a drive force is transmitted from the electric motor to the respective threaded shafts are so arranged that both movable bodies may be moved in opposite directions at an equivalent velocity as the electric motor rotates.

A mechanism is provided to adjust, absorb and combine any relative phasal shift between the threaded shafts. Preferably, the mechanism comprises a wide groove formed in the inner periphery of a wheel adapted to be engaged with one of the pair of threaded shafts and to thereby transmit the drive force from the electric motor to the one threaded shaft so that the relative positions of the one threaded shaft and the wheel may be adjusted according to a position at which a pin is urged into the groove.

BRIEF DESCRIPTION OF THE DRAWINGS

FIG. 5 is an end view, partially in section, of the actuator as viewed from the right in FIG. 3;

FIG. 8 is a plan view similar to FIG. 3 illustrating another embodiment of an actuator in accordance with the present invention.

DETAILED DESCRIPTION OF THE DRAWINGS

Figure 1:
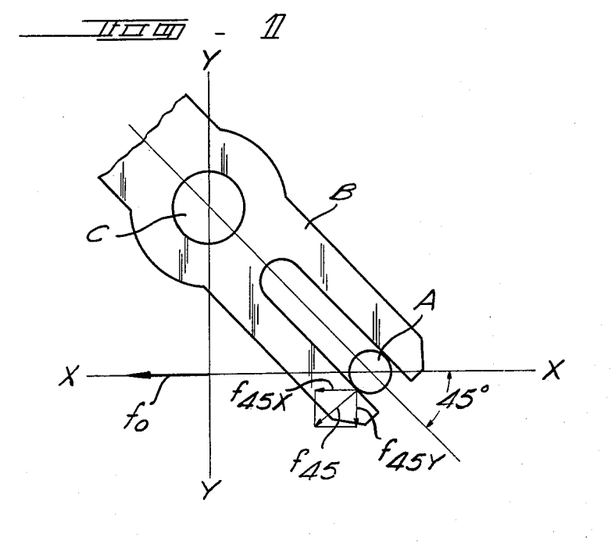
FIG. 1 is a schematic illustration of a principle in accordance with the present invention by which a starting torque for an electric motor may be effectively reduced by an arrangement of the electrically driven actuator in which one or more operating arms adapted to swing are utilized and the operation of opening and closing a valve stem is effected substantially through an angle of 90°.

Referring to FIG. 1, a relative force is shown occurring between a projecting shaft A provided on a movable body (not shown in FIG. 1) and an operating arm B on the assumption of an orthogonal planar coordinate system in the plane perpendicular to a rotary shaft C adapted to be associated with a valve stem for operation of a valve body. The projecting shaft A is movable along the X axis of the coordinate system, and the Y axis corresponds to a straight line which extends transversely of and through the axis of the rotary shaft C at a right angle to the X axis. For purposes of discussion herein, the movable body which provides the projecting shaft A is considered to be carried on a threaded shaft (not shown in FIG. 1) which extends in the direction of the X axis and which is rotated by an electric motor (not shown in FIG. 1) for purposes of moving the shaft A in the direction of the X axis. A magnitude of output torque of the electric motor required for rotation of the valve body will be comparatively considered with respect to the case where the electric motor is operatively connected with the valve stem at a predetermined deceleration ratio and with respect to the case where the mechanism according to the present invention is employed.

In accordance with the present invention, the output torque of the electric motor required for rotation of the valve body may vary depending on the angular position of the pivotally mounted operating arm B, but the output torque of the electric motor equal to that as usually required by the mechanism of the prior art is required when the axis of the projecting shaft A comes into coincidence with the Y axis. For convenience of illustration, it is assumed in FIG. 1 that no friction is present in the mechanism under a constant load and the slot or slit surface of the operating arm B with which the projecting shaft A is slidably engaged extends along a straight line connecting the axis of the rotary shaft C and the axis of the projecting shaft A.

A force with which the threaded shaft thrusts the projecting shaft A in the direction of the X axis (this force is proportional to the output of the electric motor) is considered here. Such a force with which the threaded shaft thrusts the projecting shaft A in the direction of the X axis when the axis of the projecting shaft A lies on the Y axis is designated by $f_o$, assuming that the operating arm B is rotated in a clockwise direction as seen in FIG. 1.

In the mechanism of the prior art, the magnitude of the force $f_o$ always takes a constant value independent of the angular position of the valve stem so far as the load is constant. In the mechanism according to the present invention, on the other hand, the projecting shaft A always exerts a force upon the surface of the slit in the operating arm B at a right angle to the surface of the slit as shown. The magnitude of this force is therefore in inverse proportion to the distance between the axes of the rotary shaft C and the projecting shaft A so far as the load is constant. The magnitude of force with which the projecting shaft A acts upon the surface of the slit in the operating arm B when the straight line connecting both axes intersects the X axis at an angle of 45° as shown is designated by $f_{45}$, and the following relationship is established between $f_o$ and $f_{45}$.

$$f_{45} = f_o/\sqrt{2} \tag{1}$$

If the force $f_{45}$ is divided into an X axis component $f_{45x}$ and a Y axis component $f_{45y}$, the magnitude of the force $f_{45x}$ corresponds to a force with which the threaded shaft thrusts the projecting shaft A at the position as shown. The Y axis component $f_{45y}$ is at a right angle to the X axis along which the movable body is moved and, accordingly, substantially independent of the magnitude of work effected by the threaded shaft. The force component $f_{45y}$ is produced as a drag as the movable body bears against the threaded shaft in the direction of the Y axis. Thus, among $f_{45}$, $f_{45x}$ and $f_{45y}$ there is established an equality as follows:

$$f_{45x} = f_{45y} = f_{45}/\sqrt{2} \tag{2}$$

Such a relationship will also be understood by considering how far the projecting shaft A is displaced for a predetermined fine rotating angle of the operating arm B. Thus, the projecting shaft A has been displaced 2 times relative to the moment at which the projecting shaft was just on the X axis.

An equality $$f_{45x} = f_o/\sqrt{2} \tag{3}$$

is introduced from combination of the equalities (1) and (2). It will be obvious also from this equality that, with the mechanism according to the present invention, a desired drive to open and close the valve stem may be achieved by a starting torque of ½ with respect to that normally required especially when the operating angle at the moment of driving is 90°.

The foregoing description has been focussed on the magnitude of starting torque required by the electric motor. Now, a difference in the velocity characteristic with which the valve is opened and closed will be considered. Assuming that the electric motor has been rotated substantially at a constant rotating velocity over the entire period of operation from the starting moment to the stopping moment, the rotary shaft C is rotated at the moments of starting and stopping, i.e., when the operating arm lies on the position as shown at ½ the velocity as compared to the case where the projecting shaft A lies on the Y axis. Practically, the mechanism is subjected to the maximum load due to the operation to open and close the valve at the moment of starting and the valve begins to be rotated from the state corresponding to the r.p.m. of zero. The velocity at which the valve is opened and closed continuously rises so that a more preferable velocity characteristic in the operation of opening and closing the valve than the mechanism of prior art in which the deceleration ratio is maintained constant may be obtained only by an improvement in the mechanical characteristic.

Figure 2:
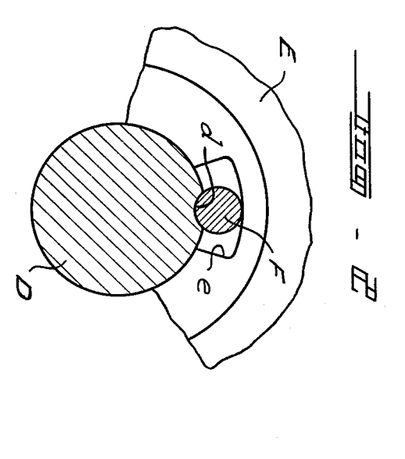
FIG. 2 is a fragmentary sectional view on an enlarged scale showing a coupling mechanism in which a threaded shaft is coupled to a wheel to synchronize relative phases of two threaded shafts in accordance with the present invention.

Another mechanical feature of the present invention resides in the provision of two drive transmitting stations symmetrically located relative to the rotary shaft so as to obtain a final rotary drive. Such an arrangement is based on the requirement that both drive transmitting stations should provide uniform drive transmission. It has been difficult for the mechanism of prior art to meet this requirement due to various errors and, according to the present invention, a satisfactory result is obtained by employing the arrangement as shown by FIG. 2. As discussed in greater detail below, the provision of the two drive transmitting stations in accordance with the present invention contemplates a pair of threaded shafts driven by an electric motor through toothed wheel arrangements. A threaded shaft D which comprises one of the two shafts and an associated toothed wheel E are shown in FIG. 2.

The requirement of uniform drive transmission is achieved by adjusting the relative position of the shaft D and the wheel E. The shaft D is provided with a shallow notch $d$ adapted to receive a pin F. The pin F is urged into a gap defined between a wide groove $e$ formed in the wheel E and the notch $d$ formed in the shaft D after the relative position of the shaft D and the wheel E has been adjusted.

Figure 3:
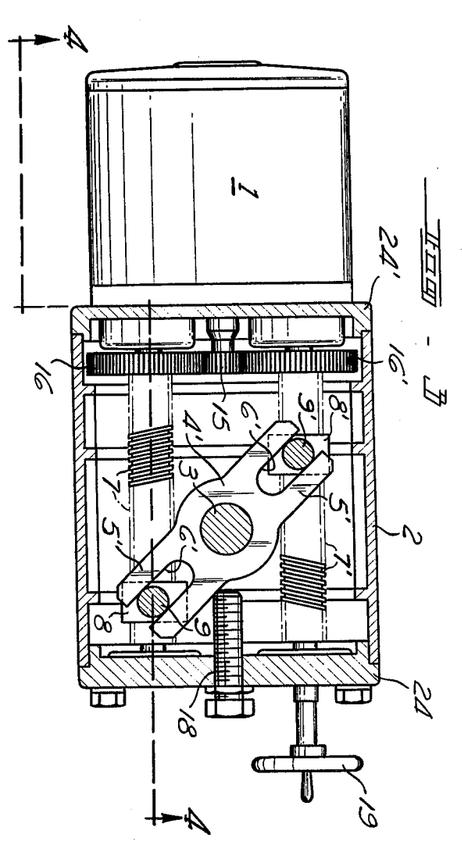
FIG. 3 is a plan view partially in section showing an electrically driven actuator in accordance with the present invention, the plane of the section is along the line 3—3 in FIG. 5 and parts are omitted for purposes of clarity.
Figure 4:
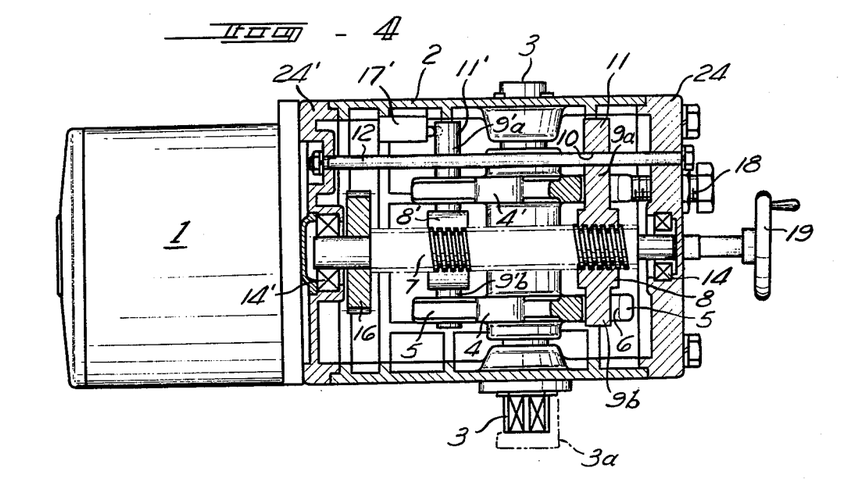
FIG. 4 is a longitudinal sectional view taken along the line 4—4 in FIG. 3.

Referring to FIGS. 3 to 5, a preferred embodiment of the present invention is shown. The identity of the functions and the components of FIGS. 1 and 2 with those of the following embodiment and the advantages achieved are readily apparent.

The embodiment shown in FIGS. 3 to 5 comprises an electrically driven actuator of the type which includes a pair of fork-like operating arms which integrally extend upwardly and downwardly, respectively, of the threaded shaft. An electric motor 1 is fitted to a housing 2 adjacent the left side thereof as shown in FIG. 3. A rotary shaft 3 is located at the center of the housing 2 in operative association with a valve shaft 3a. A pair of transverse operating arms 4, 4' are secured to the rotary shaft 3 in upper and lower positions. Each of the operating arms 4, 4' comprises a pair of fork portions 5, 5' extending symmetrically of the shaft 3 and longitudinal slots or slits 6, 6' respectively formed in each of the fork portions 5, 5'.

A pair of threaded shafts 7, 7' are arranged in a plane transverse of the rotary shaft 3 so that they extend symmetrically of the rotary shaft 3 and in parallel to each other. A pair of feed nuts or movable bodies 8, 8' are mounted on the respective threaded shafts 7, 7', and they are adapted to be moved in opposite directions while maintained exactly ast symmetric positions with respect to the axis of the rotary shaft 3. The respective feed nuts 8, 8' have, as seen in FIGS. 4 and 5, a pair of projecting shafts 9a, 9b and 9'a, 9'b extending upwardly and downwardly along their respective axes which in turn extend in parallel to the axis of the rotary shaft 3.

The upper projecting shafts 9a, 9'a of each feed nut 8, 8' includes a head 11, 11' as its upper extension and a transverse guide hole 10, 10' (only one of which is shown) extending through the shaft at a level lower than the heads 11, 11'. A pair of guide tie rods 12, 12' extend from one side cover 24 of the housing 2 through the associated guide holes 10, 10' to the other side cover 24', and serve not only to hold the feed nuts 8, 8' upright but also to clamp both side covers 24, 24' against the housing 2.

The rotary shaft 3 is journaled through a pair of bearings 13, 13' (FIG. 5) provided on vertically opposite sides of the housing 2. The pair of threaded shafts 7, 7' are journaled through pairs of ball bearings 14, 14' at opposite ends thereof. The ball bearings 14, 14' are preferably of the angular contact type which tolerate a thrust load of the associated threaded shaft 7, 7'.

The pair of threaded shafts 7, 7' are respectively provided with toothed wheels 16, 16' fixed thereto. Each of the wheels 16, 16' has the same number of teeth, and they are associated with each other through a pinion 15 directly connected with the output shaft of the electric motor 1. One of the threaded shafts 7, 7' is coupled to the associated toothed wheel 16, 16' in the manner as previously described with reference to FIG. 2.

In this embodiment, the pair of threaded shafts 7, 7' have their respective threads wound in opposite directions, since the shafts are operatively associated with the output shaft of the electric motor 1 in the manner as mentioned above. The pair of projecting shafts extending upwardly and downwardly from each feed nut 8, 8' are slidably engaged with the longitudinal slits 6, 6' formed in the respective fork portions 5, 5'. The pair of operating arms 4, 4' include a total of four fork portions symmetrically with respect to the shaft 3, and the linear movements of the feed nuts 8, 8' are smoothly converted into the swinging movements of the respective operating arms 4, 4'.

There are provided a pair of limit switches 17, 17' at the ends of movement of the heads 11, 11' of the respective projecting shafts 9a, 9'a so that, when the heads come into contact with the associated limit switches, the electric motor 1 is deenergized. The limit switches 17, 17' are preferably arranged both at the illustrated positions on the left side within the housing 2 as seen in FIG. 4 so that one of the heads 11, 11' is in contact with the corresponding limit switch 17, 17' when the operating arms 4, 4' are at the non-operative positions. The limit switches serve here as memories, since the direction in which the electric motor 1 subsequently starts to rotate depends upon which of two limit switches is in contact with its associated head. In other words, the direction in which the electric motor 1 subsequently starts to rotate may be reliably memorized by these limit switches even if a source for energization of a control system is interrupted, or there is a considerably long period between the moment at which the operating arms 4, 4' were stopped and the moment at which the operating arms are once again activated. A signal provided by each switch 17, 17' may be used as the signal for a device by which the operating positions of the valve body are visually determined.

The range in which the operating arms 4, 4' are movable may also be regulated by an adjusting bolt 18 as seen on the right end of FIG. 3. The bolt 18 secured to the side cover 24 of the housing 2 is provided at its shank end with a tapering portion formed by chamfering so that the outer surface of the fork portion 5' of the operating arm 4' is brought into contact with the tapered portion when the operating arm 4' reaches the end of its movement. The bolt 18 extends transversely of the axis of the rotary shaft 3, and it is brought into contact with the outer surface of the corresponding fork portions 5' at both non-operative positions of the operating arm 4', since the two fork portions 5' of the operating arm 4' are symmetrically shaped. Once the electric motor 1 has been deenergized, the operating arms are prevented from being further rotated by the bolt 18 under effects such as a rotary inertia of a rotor of the electric motor 1. The position at which the bolt 18 is clamped may be adjusted by rotating a bolt head which projects outwardly from the side cover 24 of the housing 2 to thereby regulate the position at which the operating arm 4' is stopped.

The threaded shaft 7' is provided at the right end as seen in FIG. 3, namely, at the end opposite to the toothed wheel 16', with an extension which outwardly projects from the right side cover 24 of the housing 2 and this extension is provided, in turn, with a handle 19 fixed thereon for manual operation in case of emergency or a torque switch of prior art by which the deenergization of the electric motor 1 is effected after the valve body has been clamped with an adequate clamping force. A blind threaded hole 20 (FIG. 5) is provided for the mounting of the housing 2 on the valve body.

In the embodiment shown in FIGS. 3 to 5, a thrust is exerted by the projecting shafts 9a, 9b, 9'a, 9'b of the associated movable bodies or feed nuts 8, 8' and produced by the toruqe of the threaded shaft 7, 7'. The thrust is converted through four points symmetrical with respect to the rotary shaft 3 into a smooth torque of the operating arms 4, 4'. The projecting shafts 9a, 9b, 9'a, 9'b are always held by the guide rods 12, 12' which also serve as the tie rod upright. Furthermore, the projecting shafts 9a, 9'a are provided at their upper ends with the heads 11, 11' formed as extensions thereof, and limit switches 17, 17' are provided within the housing 2 at positions corresponding to the ends of the movements of the heads so that the direction in which the electric motor 1 subsequently starts to rotate may be reliably and easily memorized by these limit switches. Thus, the mechanism of reliable operation may be obtained from the least number of parts and this permits the mechanism to be of a small size and light weight as a whole.

Figure 6:
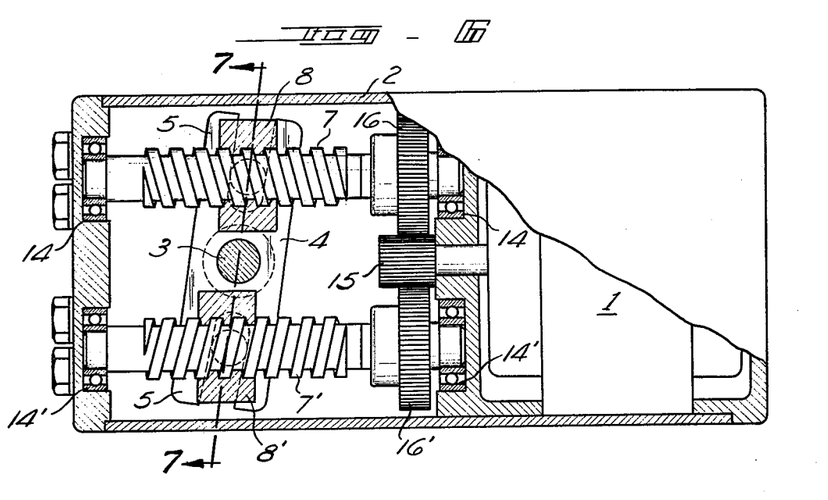
FIG. 6 is a plan view partially in section illustrating another embodiment of an actuator in accordance with the present invention.
Figure 7:
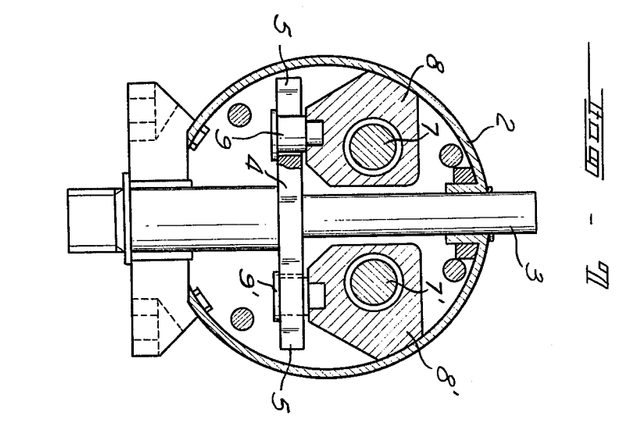
FIG. 7 is a sectional view taken along the line 7—7 in FIG. 6, with parts shown in elevation for purposes of clarity.

Another embodiment of the present invention substantially similar to the previous embodiment except that the movable body is provided with a single projecting shaft is shown in FIGS. 6 and 7. Accordingly, the parts common to both embodiments are designated by the common reference numerals.

A principal feature of this embodiment resides in the fact that a relatively small torque is required to start the electric motor 1. This feature enables a higher drive to be applied to increase the r.p.m. of the rotor is starting than in the electrically driven actuator, so that the electric motor may obtain a relatively high r.p.m and achieve its work at a correspondingly high efficiency, since the work efficiency may be expressed by a product of the magnitude of torque and the r.p.m. of motor. Even if the same work is achieved by the same electric motor, the embodiment mentioned here may provide a substantially higher efficiency and highly improved characteristic of operation. The velocity characteristic for opening and closing of the valve may be improved only by the mechanical feature and the velocity characteristic of slow-rapid-slow may be obtained as the normal velocity characteristic. Accordingly, even a requirement for extremely exact control of valve opening and closing velocity may be met by a single control mechanism and no control mechanism is necessary when the requirement is relatively generous.

The embodiment of FIGS. 6 and 7 is particularly advantageous in an application wherein an AC electric motor adapted to minimize the starting torque compared to the rated torque is employed. The feature of this embodiment permits an electric motor of small size to be used, maintaining an efficiency higher than that of the prior art. Thus, the electrically driven actuator of small size, light weight and low cost may be obtained. This embodiment also results in enlarging the range within which the DC electric motor of the prior art may be replaced by the AC electric motor and in the simplification of a power source arrangement in the control system.

FIG. 8 illustrates still another embodiment of the present invention in which the operating arm structure is replaced by a worm wheel 22 fixed on the rotary shaft 3. In this embodiment, a pair of worm shafts 23, 23' are subjected at two positions symmetrical with respect to the wheel 22 to a desired adjustment in the same manner as described with reference to FIG. 2 to obtain a final rotary drive. The electrically driven actuator of this embodiment may be used to open and close a valve, such as the gate valve, which requires an operation of multi-rotation of the valve stem. According to this embodiment, the bearings of the rotary shaft 3 are subjected to no excessive force and the worm wheel of small size may be employed, so that the mechanism as a whole may be of small size and light weight.

FIG. 8 also illustrates, as a preferred form in such an arrangement, torque limiting mechanisms 25, 25' associated with respective free ends of the worm shafts 23, 23' located opposite to the drive transmitting mechanism connected to the electric motor 1. The torque limiting mechanisms 25, 25' are identical, and only the structure of the mechanism 25 is discussed in detail. The mechanical feature of the torque limiting mechanism 25 lies in that the worm shaft 23 is movable in the direction of thrust. A thrust load of the worm shaft 23 is buffered by Belleville springs 26, 26' which hold a movable piece 27 operatively associated with a torque switch (not shown) therebetween and compressed by opposite washers 28, 29. The washer 28 bears against a shoulder 40 of the worm shaft 23 and the washer 29 bears against a nut 41 secured on a threaded portion 42 formed around the right end of the worm shaft 23. The Belleville springs 26, 26' are sufficiently preloaded so that the torque switch may be activated after the movable piece 27 moves in the direction of thrust. Although such a torque limiting mechanism has already been well known, it has been shown by an endurance test of a trial mechanism in which the worm wheel 22 is driven by a single worm shaft 23 that abnormally worn portions often occur between the toothed surfaces of the worm and the worm wheel 22. This problem is overcome by the mechanism of the embodiment as shown, in which the worm wheel 22 is driven by a pair of worm shafts 23, 23'. This means that the drive force is somewhat uniformly dispersed on the pair of worm shafts 23, 23', and based on the fact that a thrust force axially exerted by the worm upon the toothed surface of the worm wheel 22 is equal to a compressive force exerted by the worm shaft 23 through the elements such as the washers 27, 28 upon the Belleville springs 26, 26' and the toothed surface is subjected to a substantially uniform thrust load so far as both Belleville springs are substantially identical to each other in their characteristic. With such a mechanism in which the worm wheel 22 has its toothed surface subjected to symmetric loads, undesired factors such as an elastic deformation of the teeth due to the load, a displacement or a deformation of the shaft which supports the worm wheel 22 and a problem of uneven engagement of the toothed surface may be effectively reduced. This fact also serves as an aid to overcome the disadvantage in the prior art as previously mentioned.

Although the present invention has been described hereinabove in reference with the preferred embodiments illustrated by the accompanying drawing, it will be apparent to those skilled in the art that various modifications in details may be employed within the technical scope as described in Claims. The present invention should be limited, therefore, not by the illustrated embodiments but by the conception as given in the Claims.

What is claimed is:

1. An electrically driven actuator comprising a housing portion including means by which the actuator is connected to a driven apparatus, a pair of threaded shafts arranged in parallel to each other in a plane extending transversely of a rotary shaft which has at least one end adapted to be associated with a valve stem to be actuated, said pair of threaded shafts being located symmetrically with respect to said rotary shaft, operating means adapted to convert rotation of said pair of threaded shafts into rotation of said rotary shaft, and a rotary drive source comprising an electric motor adapted to drive said pair of threaded shafts, wherein at least one of said pair of threaded shafts is associated in a section for drive transmission from said rotary drive source with a mechanism adapted to adjust, absorb and combine any relative phasal shift between both threaded shafts, and said mechanism for adjustment of the phasal shift between the pair of threaded shafts comprises a wide groove formed in a wheel adapted to be engaged with an associated threaded shaft along an engaging opening in said wheel, said groove having a constant depth from the surface of the associated threaded shaft, and a pin adapted to be urged into a gap defined by the associated threaded shaft surface and said groove after an angular position relative to a predetermined position on the shaft side has been adjusted.

2. An electrically driven actuator according to claim 1 wherein said pair of threaded shafts respectively carry movable bodies adapted to move on the respective shafts as the respective shafts rotate, each of said movable bodies including a projecting shaft, and said operating means comprise operating arm means secured on said rotary shaft so that said operating arm means are turned integrally with said rotary shaft within the movement range of said projecting shaft, said operating arm means including longitudinal slot means with which said projecting shaft is slidably engaged to provide a swinging movement of said operating arm means.

3. An electrically driven actuator according to claim 2 wherein each of said projecting shafts includes a pair of coaxial shaft extensions projecting upwardly and downwardly from the associated movable body, said longitudinal slot means include a pair of longitudinal slots associated with each of said threaded shafts and symmetrically located with respect thereto, and each of said pairs of longitudinal slots slidably engage an associated pair of coaxial shaft extensions.

4. An electrically driven actuator according to claim 1 wherein said operating means comprise a worm wheel secured on said rotary shaft between said pair of threaded shafts in engagement with the threads of the respective threaded shafts.

5. An electrically driven actuator according to claim 4 wherein a torque limiting mechanism is provided adjacent an end of each of said threaded shafts, said torque limiting mechanisms being adapted to resiliently determine the positions of said shafts in the thrust direction through resilient members which permit said shafts to be displaced in the thrust direction.

6. In an electrically driven valve stem actuator, a housing portion having a rotary shaft mounted therein adapted to be operatively connected to a valve stem to be actuated, threaded shaft means mounted within said housing portion in a plane extending transversely of the axis of said rotary shaft, operating means operatively connecting said threaded shaft means and said rotary shaft to convert rotation of said threaded shaft means into rotation of said rotary shaft, and gear means adapted to operatively connect an electric motor to said threaded shaft means for rotation thereof, said threaded shaft means including at least one threaded shaft and said gear means including adjustment means for independently adjusting the angular orientation of said one threaded shaft with respect to said gear means.

7. An electrically driven actuator as set forth in claim 6 wherein said adjustment means include a pin member for rotationally fixing a drive gear to said one threaded shaft, said drive gear including an axially extending groove adjacent its shaft engaging surface having an annulus shaped cross-section of uniform radial dimension and an angular dimension greater than the corresponding dimension of said pin member, and said groove and the adjacent surface of said one threaded shaft defining an opening for receiving said pin member in a rotationally locking position after said one threaded shaft has been disposed in a desired angular orientation.

8. An electrically driven actuator as set forth in claim 6 wherein said threaded shaft means include a second threaded shaft parallel to said one threaded shaft and said threaded shafts are symmetrically disposed with respect to said rotary shaft, and said operating means include a movable body carried on each of said threaded shafts arranged for axial movement therealong upon shaft rotation, an operating arm rotationally fixed to said rotary shaft including a pair of elongated slots respectively intersecting and sweeping the movement ranges of said movable bodies upon pivotal, swinging movement of said operating arm, said movable bodies being respectively slidably engaged in said elongated slots to provide the pivotal, swinging movement of said operating arm upon shaft rotation and rotation of said rotary arm.

9. An electrically driven actuator as set forth in claim 6 wherein said threaded shaft means include a second threaded shaft parallel to said one threaded shaft and said threaded shafts are symmetrically disposed with respect to said rotary shaft, and said operating means include a worm wheel member rotationally fixed to said rotary shaft and threadedly engaged with each of said threaded shafts to convert shaft rotation into rotation of said rotary shaft.

10. An electrically driven actuator comprising a housing portion including means by which the actuator is connected to a driven apparatus, a pair of threaded shafts arranged in parallel to each other in a plane extending transversely of a rotary shaft which has at least one end adapted to be associated with a valve stem to be actuated, said pair of threaded shafts being located symmetrically with respect to said rotary shaft operating means adapted to convert rotation of said pair of threaded shafts into rotation of said rotary shaft, and a rotary drive source, wherein at least one of said pair of threaded shafts is driven by said rotary drive source through a gear member including a mechanism adapted to adjust absorb and combine any relative phasal shift between both threaded shafts, said mechanism including an arcuate recess extending along a shaft engaging operating in said gear member and a cooperating recess in the surface of said one of said threaded shafts for receiving a pin member to rotationally fix said gear to said one of said threaded shafts.

11. An electrically driven actuator according to claim 10 including a movable body carried on an associated one of said threaded shafts and adapted to move therealong upon shaft rotation, said movable body including a projecting shaft means, and said operating means including operating arm means secured on said rotary shaft so that said operating arm means are turned integrally with said rotary shaft within the movement range of said projecting shaft means, said projecting shaft means being guided by tie rod means adapted to connect side covers at opposite ends of the housing and to maintain the axis of said projecting shaft means parallel to the axis of said rotary shaft.

12. An electrically driven actuator according to claim 11 wherein said projecting shaft means include a head portion, and a switching element is disposed within said housing at the end of a movement range of said head portion so that said switching element is activated by said head portion at the end of movement of said movable body.

13. An electrically driven actuator according to claim 12 wherein a second movable body including a projecting shaft and head portion is movable mounted on the other one of said threaded shafts, and a second switching element is disposed within said housing at the end of the movement of said second head portion for actuation by said second head portion, and said switching elements are located at adjacent axial ends of said threaded shafts.

14. An electrically driven actuator comprising a housing portion having side covers and including means by which the actuator is connected to a driven apparatus, a pair of threaded shafts arranged in parallel to each other in a plane extending transversely of a rotary shaft which has at least one end adapted to be associated with a valve stem to be actuated, said pair of threaded shafts being located symmetrically with respect to said rotary shaft, operating means adapted to convert rotation of said pair of threaded shafts into rotation of said rotary shaft, and a rotary drive source comprising an electric motor adapted to drive said pair of threaded shafts, wherein at least one of said pair of threaded shafts is associated in a section for drive transmission from said rotary drive source with a mechanism adapted to adjust, absorb and combine any relative phasal shift between both threaded shafts, said pair of threaded shafts respectively carry movable bodies adapted to move on the respective shafts as the respective shafts rotate, each of said movable bodies including a projecting shaft, and said operating means comprise operating arm means secured on said rotary shaft so that said operating arm means are turned integrally with said rotary shaft within the movement range of said projecting shaft, said projecting shaft being guided by a tie rod connecting said side covers together and held by this tie rod upright, said operating arm means including longitudinal slot means with which said projecting shaft is slidably engaged to provide a swinging movement of said operating arm means.

15. An electrically driven actuator comprising a housing portion including means by which the actuator is connected to a driven apparatus, a pair of threaded shafts arranged in parallel to each other in a plane extending transversely of a rotary shaft which has at least one end adapted to be associated with a valve stem to be actuated, said pair of threaded shafts being located symmetrically with respect to said rotary shaft, operating means adapted to convert rotation of said pair of threaded shafts into rotation of said rotary shaft, and a rotary drive source comprising an electric motor adapted to drive said pair of threaded shafts, wherein at least one of said pair of threaded shafts is associated in a section for drive transmission from said rotary drive source with a mechanism adapted to adjust, absorb and combine any relative phasal shift between both threaded shafts, said pair of threaded shafts respectively carry movable bodies adapted to move on the respective shafts as the respective shafts rotate, each of said movable bodies including a projecting shaft, and said operating means comprise operating arm means secured on said rotary shaft so that said operating arm means are turned integrally with said rotary shaft within the movement range of said projecting shaft, said operating arm means including longitudinal slot means with which said projecting shaft is slidably engaged to provide a swinging movement of said operating arm means at least one of said projecting shafts including a head portion arranged to engage a switching element adapted to be activated by said head portion at the end of the movement of said movable body.

16. An electrically driven actuator comprising a housing portion including means by which the actuator is connected to a driven apparatus, a pair of threaded shafts arranged in parallel to each other in a plane extending transversely of a rotary shaft which has at least one end adapted to be associated with a valve stem to be actuated, said pair of threaded shafts being located symmetrically with respect to said rotary shaft, operating means adapted to convert rotation of said pair of threaded shafts into rotation of said rotary shaft, and a rotary drive source comprising an electric motor adapted to drive said pair of threaded shafts, wherein at least one of said pair of threaded shafts is associated in a section for drive transmission from said rotary drive source with a mechanism adapted to adjust, absorb and combine any relative phasal shift between both threaded shafts, said pair of threaded shafts respectively carry movable bodies adapted to move on the respective shafts as the respective shafts rotate, each of said movable bodies including a projecting shaft, said operating means comprise operating arm means secured on said rotary shaft so that said operating arm means are turned integrally with said rotary shaft within the movement range of said projecting shaft, said operating arm means including longitudinal slot means with which said projecting shaft is slidably engaged to provide a swinging movement of said operating arm means, and externally adjustable stop means are carried by said housing for limiting said swinging movement of said operating arm, said stop means comprising a rigid member adjustably extending into the path of the swinging movement of said operating arm means.

* * * * *